US011782320B2

(12) United States Patent
Chen et al.

(10) Patent No.: US 11,782,320 B2
(45) Date of Patent: Oct. 10, 2023

(54) DISPLAY SUBSTRATE, COMPENSATION METHOD AND DISPLAY DEVICE

(71) Applicants: Fuzhou BOE Optoelectronics Technology Co., Ltd., Fujian (CN); BOE Technology Group Co., Ltd., Beijing (CN)

(72) Inventors: Jixiang Chen, Beijing (CN); Wenchao Wang, Beijing (CN); Jinliang Wang, Beijing (CN); Shanshan Xu, Beijing (CN); Xu Xu, Beijing (CN); Xin Fang, Beijing (CN)

(73) Assignees: Fuzhou BOE Optoelectronics Technology Co., Ltd., Fujian (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/512,540

(22) Filed: Oct. 27, 2021

(65) Prior Publication Data

US 2022/0269139 A1 Aug. 25, 2022

(30) Foreign Application Priority Data

Feb. 20, 2021 (CN) ........................ 202110194536.1

(51) Int. Cl.
*G02F 1/1362* (2006.01)

(52) U.S. Cl.
CPC .. *G02F 1/136286* (2013.01); *G02F 1/136204* (2013.01)

(58) Field of Classification Search
CPC ..................................................... G02F 1/1362
See application file for complete search history.

(56) References Cited

U.S. PATENT DOCUMENTS

2005/0162605 A1* 7/2005 Murade ................ H04N 9/3105 349/139
2007/0002243 A1* 1/2007 Kim .................... G02F 1/13452 349/139
2010/0253610 A1* 10/2010 Lee ...................... G09G 3/3611 438/23
2017/0236481 A1* 8/2017 Her ................... G02F 1/136209 345/206
2018/0233498 A1* 8/2018 Xu ........................ H01L 27/124
2019/0272784 A1* 9/2019 Huang ................. G09G 3/3648
2020/0342799 A1* 10/2020 Yang ................. H01L 27/14812
2022/0004067 A1* 1/2022 Sasanuma .............. G09G 3/006

FOREIGN PATENT DOCUMENTS

CN 109188801 A 1/2019

* cited by examiner

*Primary Examiner* — Sang V Nguyen
(74) *Attorney, Agent, or Firm* — IPRO, PLLC

(57) ABSTRACT

The present disclosure provides a display substrate, a compensation method and a display substrate. The non-display area includes a first fan-out area and a second fan-out area arranged at two opposite sides of the display area along a first direction respectively. The display substrate further includes a plurality of data lines extending along the first direction, each data line includes a first portion, a second portion and a third portion, at least part of the first portion is arranged in the display area, the second portion is arranged in the first fan-out area, the third portion is arranged in the second fan-out area, and the data lines have a substantially same resistance.

10 Claims, 4 Drawing Sheets

12
11
ESD
20
30

30
11
11
ESD
20
13
40

DISPLAY SUBSTRATE, COMPENSATION METHOD AND DISPLAY DEVICE

CROSS-REFERENCE TO RELATED APPLICATION

This application claims a priority of Chinese patent application No. 202110194536.1 filed on Feb. 20, 2021, which is incorporated herein by reference in its entirety.

TECHNICAL FIELD

The present disclosure relates to the field of display technology, in particular to a display substrate, a compensation method and a display device.

BACKGROUND

Display product with a large size, a high resolution and a high refresh rate has a low charging margin and is sensitive to a resistance difference between data lines. Especially when the display product needs to be provided with a narrow bezel, a wiring space in a fan-out area is limited, and resistances of the data lines in the fan-out area are different, so charging levels of pixels are different and the pixels in some areas of the display product are charged insufficiently. At this time, display brightness in these areas is relatively small, and such a phenomenon as block defect occurs.

SUMMARY

An object of the present disclosure is to provide a display substrate, a compensation method and a display device, so as to solve the problem of block defect for the display product.

In one aspect, the present disclosure provides in some embodiments a display substrate, including a display area and a non-display area surrounding the display area. The non-display area includes a first fan-out area and a second fan-out area arranged at two opposite sides of the display area along a first direction respectively. The display substrate further includes a plurality of data lines extending along the first direction, each data line includes a first portion, a second portion and a third portion, at least part of the first portion is arranged in the display area, the second portion is arranged in the first fan-out area, the third portion is arranged in the second fan-out area, and the data lines have a substantially same resistance.

In a possible embodiment of the present disclosure, the first portions of the data lines have a substantial same resistance, and a sum of resistances of the second portion and the third portion of each data line is substantially the same.

In a possible embodiment of the present disclosure, the plurality of data lines includes a first data line and a second data line, a length of a second portion of the first data line is greater than a length of a second portion of the second data line, and a length of a third portion of the first data line is smaller than a length of a third portion of the second data line.

In a possible embodiment of the present disclosure, the first portion is arranged at a same layer and made of a same material as the third portion.

In a possible embodiment of the present disclosure, the first portion and the second portion are arranged at different layers.

In a possible embodiment of the present disclosure, the plurality of data lines is divided into a plurality of data line groups, the display substrate further includes a plurality of chip-on-films corresponding to the data line groups respectively, and each chip-on-film is coupled to the second portions of the data lines in a corresponding data line group.

In a possible embodiment of the present disclosure, layouts of the first portions of each data line group are substantially the same, layouts of the second portions of each data line group are substantially the same, and layouts of the third portions of each data line group are substantially the same.

In a possible embodiment of the present disclosure, each data line group includes a first group of data lines and a second group of data lines, the second portions of the first group of data lines and the second portions of the second group of data lines are arranged symmetrically, and the third portions of the first group of data lines and the third portions of the second group of data lines are arranged symmetrically.

In a possible embodiment of the present disclosure, the first portion and/or the third portion include a bow-shaped bending structure.

In a possible embodiment of the present disclosure, the display substrate further includes: a plurality of first electro-static discharge circuitries electrically coupled to first ends of the first portions respectively, and each configured to discharge static electricity on the corresponding data line; and a plurality of second electro-static discharge circuitries electrically coupled to second ends of the first portions respectively, and each configured to discharge static electricity on the corresponding data line.

In another aspect, the present disclosure provides in some embodiments a display device including the above-mentioned display substrate.

In yet another aspect, the present disclosure provides in some embodiments a method for compensating the above-mentioned display substrate, including: determining a length of a third portion of each data line in accordance with a resistance of a second portion of each data line of the display substrate; and determining a layout of the third portion of each data line in accordance with the length of the third portion of each data line.

DETAILED DESCRIPTION

The present disclosure will be described hereinafter in details in conjunction with the drawings and embodiments.

Figure 1:
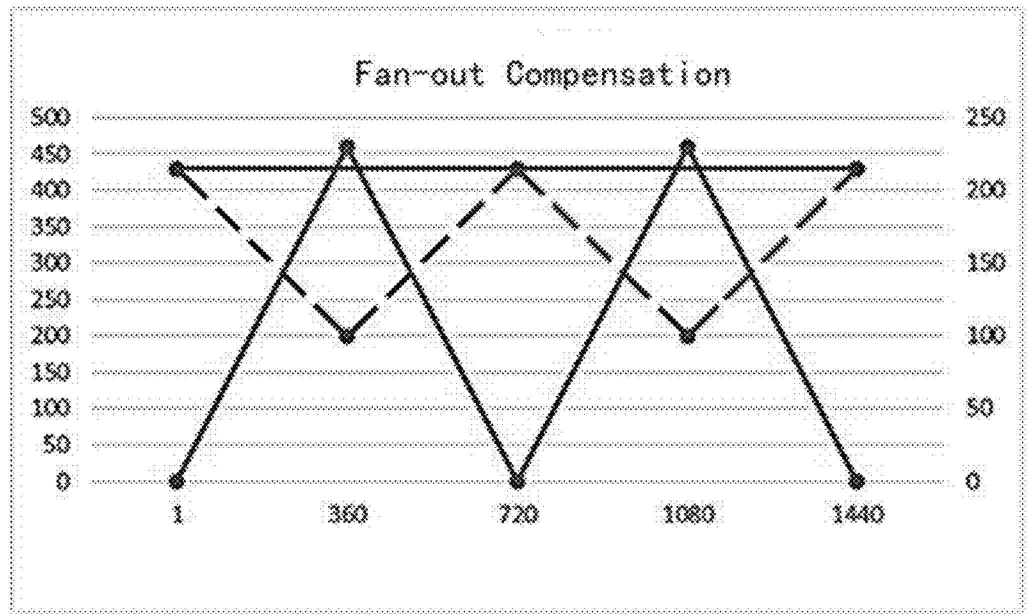
FIG. 1 is a schematic view showing the compensation of a resistance of a data line according to one embodiment of the present disclosure.
Figure 2:
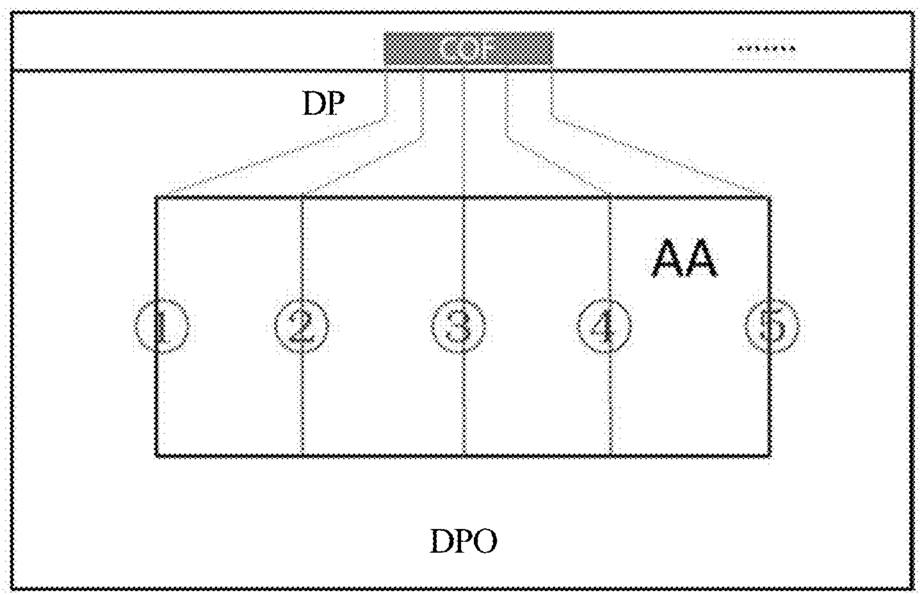
FIG. 2 is a schematic view showing a first portion and a second portion of the data line according to one embodiment of the present disclosure.
Figure 3:
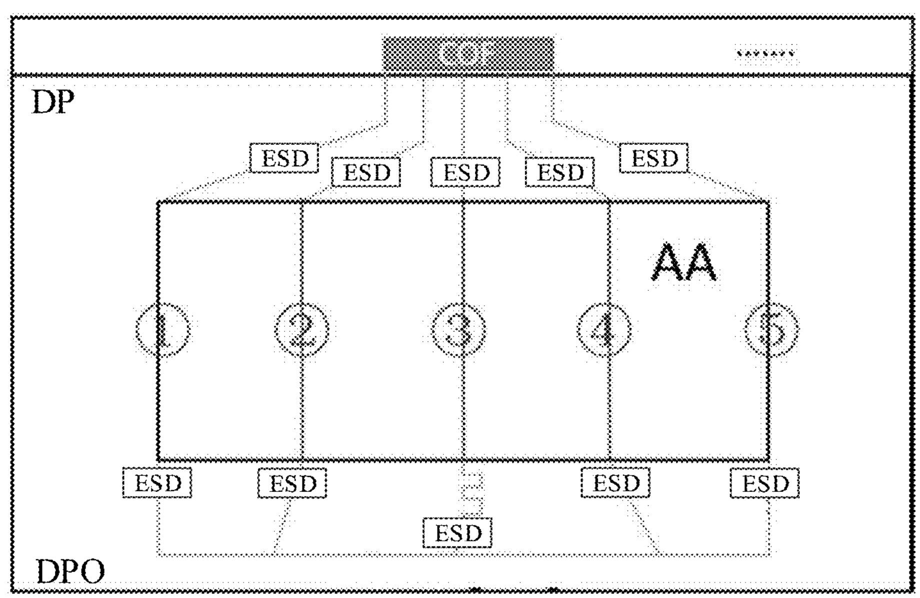
FIG. 3 is a schematic view showing the data line after the compensation according to one embodiment of the present disclosure.
Figure 4:
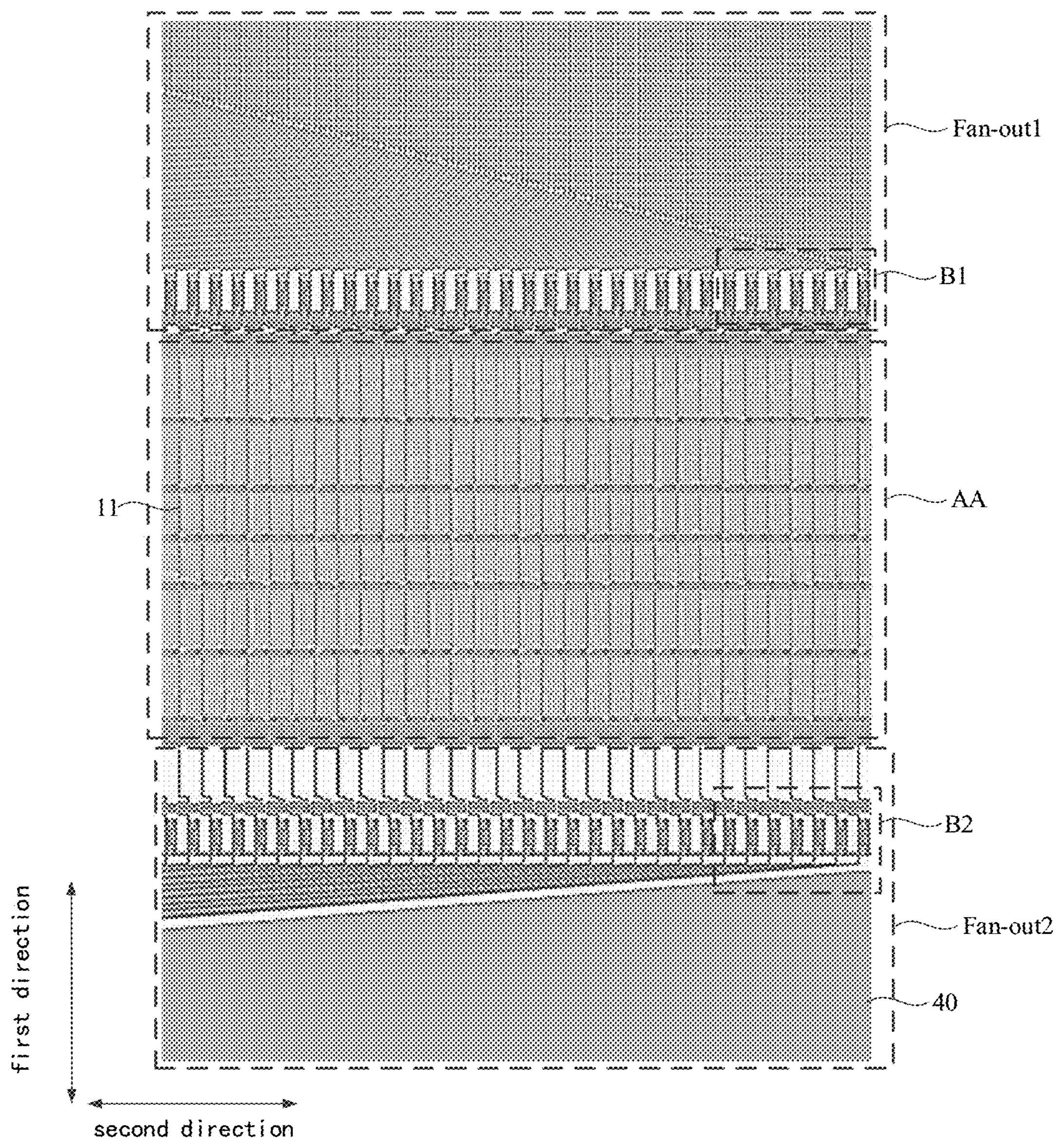
FIG. 4 is a schematic view showing a layout of the data line according to one embodiment of the present disclosure.
Figure 5:
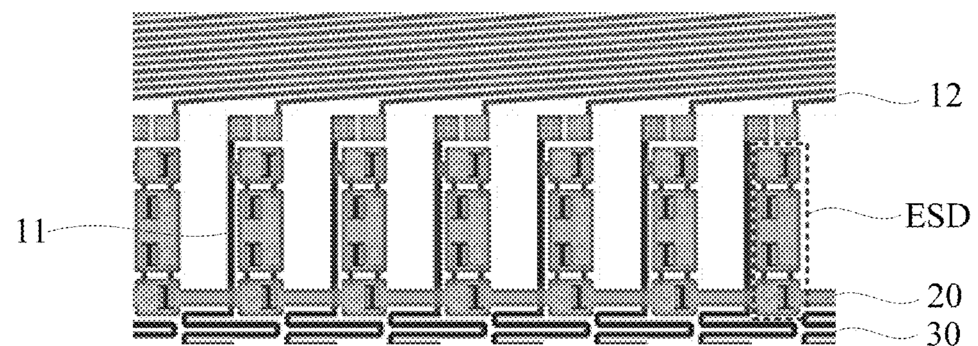
FIG. 5 is an enlarged view of B1 in FIG. 4.
Figure 6:
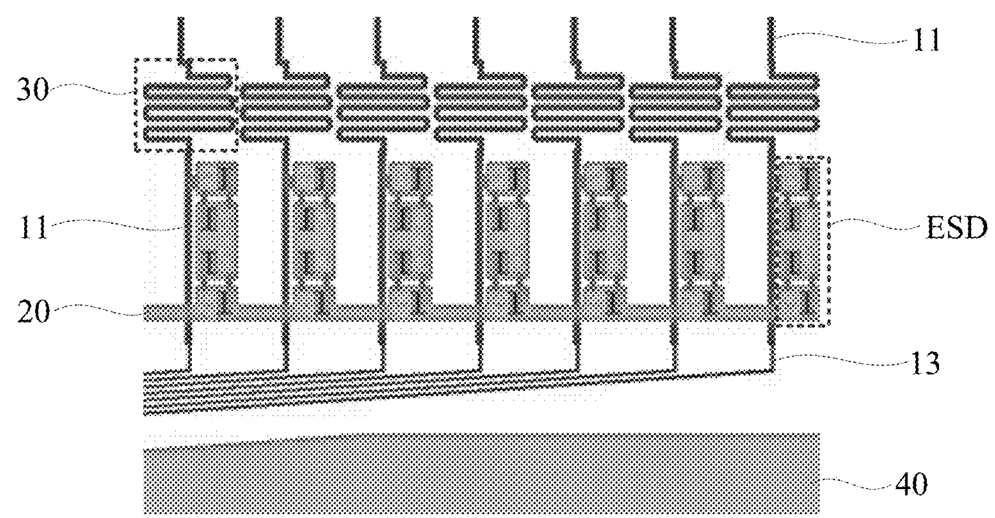
FIG. 6 is an enlarged view of B2 in FIG. 4.

As shown in FIG. 1 and FIG. 2, an abscissa in FIG. 1 represents a serial number of a data line, an ordinate on the left represents a resistance of a data line at a Data Pad (DP) side, and an ordinate on the right represents a resistance of a data line at a Data Pad Opposite (DPO) side. A unit of the resistance is Ω. A dashed line represents the resistance of a portion of the data line at the DP side, a transverse straight line represents a total resistance of the data line after compensation, and a solid curved line represents the resistance of a portion of the data line at the DPO side. Among five data lines (for example, ①/②/③/④/⑤) in FIG. 2, portions of these data lines in a display area AA have a same resistance. Due to the limitation of a layout space, the portions of the five data lines at the DP side have different resistances.

Taking an Ultra High Definition (UHD) display product as an example, the resistance $R_{AA}$ of each data line in the display area is about 1800Ω. Referring to the dashed line in FIG. 1, a maximum resistance of the portion of the data line at the DP side is 430Ω, and a minimum resistance of the portion of the data line at the DP side is 200Ω. Before the compensation, a maximum percentage of a resistance difference between different data lines to a total resistance is $(R_{Max}-R_{Min})/R_{all}=10.3\%$, so there is a relatively high risk of block defect. $R_{All}=R_{Fan\text{-}out}+R_{AA}$, and $R_{Fan\text{-}out}=R_{DP}+R_{DPO}$, where $R_{Max}$ represents a maximum value of $R_{Fan\text{-}out}$, and $R_{Min}$ represents a minimum value of $R_{Fan\text{-}out}$.

Referring to the transverse straight line and the solid curved line in FIG. 1, when the resistance of the data line at the DPO side is compensated, $(R_{Max}-R_{Min})/R_{all}$ is about 0, so it is able to prevent the occurrence of the block defect due to the resistance difference.

Referring to FIGS. 3 to 6, the present disclosure provides in some embodiments a display substrate, which includes a display area AA and a non-display area surrounding the display area AA. The non-display area includes a first fan-out area Fan-out 1 and a second fan-out area Fan-out 2 arranged along a first direction.

The display substrate further includes a plurality of data lines extending along the first direction. Each data line includes a first portion 11, a second portion 12 and a third portion 13. At least a part of the first portion 11 is arranged in the display area AA, the second portion 12 is arranged in the first fan-out area Fan-out 1, the third portion 13 is arranged in the second fan-out area Fan-out 2, and the data lines have a substantially same resistance.

Illustratively, the first fan-out area Fan-out1 and the second fan-out area Fan-out 2 are arranged at opposite sides of the display area along the first direction respectively. Illustratively, the first fan-out area Fan-out 1 is arranged at a DP side, and the second fan-out area Fan-out2 is arranged at a DPO side.

Illustratively, the plurality of data lines is arranged along a second direction intersecting the first direction, and adjacent data lines are spaced apart from each other for insulation. Illustratively, at least a part of each data line extends along the first direction.

Illustratively, the first direction includes a vertical direction, and the second direction includes a horizontal direction.

Illustratively, the display substrate further includes a data line merely including a first portion 11 and a second portion 12.

Illustratively, each of at least a part of the data lines includes a first portion 11, a second portion 12 and a third portion 13. Illustratively, at least a part of the first portion 11 is arranged in the display area. Illustratively, the first portion 11 includes a portion in the display area, a portion in the first fan-out area Fan-out1 and a portion in the second fan-out area Fan-out2. Illustratively, the second portion 12 and/or the third portion 13 includes at least a portion extending along a third direction intersecting both the first direction and the second direction.

Illustratively, a resistance of each of the at least a part of the data lines is a sum of a resistance of the first portion 11, a resistance of the second portion 12 and a resistance of the third portion 13.

Illustratively, the display substrate may be applied in a liquid crystal display device.

Illustratively, the resistance of the third portion 13 of each data line depends on the resistance of the second portion 12, so as to minimize the resistance difference between the data lines.

According to the display substrate in the embodiments of the present disclosure, the non-display area includes the first fan-out area Fan-out1 and the second fan-out area Fan-out2, and the first fan-out area and the second fan-out area are arranged at opposite sides of the display area along the first direction respectively. Each of at least a part of the data lines includes the first portion 11, the second portion 12, and the third portion 13. At least a part of the first portion 11 is arranged in the display area, the second portion 12 is arranged in the first fan-out area Fan-out1, and the third portion 13 is arranged in the second fan-out area Fan-out 2. Through adjusting the resistance of the third portion 13, it is able to adjust the resistance of each data line, thereby to provide the plurality of data lines with a substantially same resistance.

Hence, through adding the third portion 13 in the second fan-out area Fan-out2, it is able to compensate for the resistance of each data line, and minimize or eliminate the resistance difference between the data lines. As a result, it is able to ensure consistent Tr and Tf on each data line, and prevent the occurrence of an RC delay due to the resistance difference between the data lines, thereby to prevent the occurrence of the block defect due to different charging levels of pixels.

In addition, in the display substrate according to the embodiments of the present disclosure, it is unnecessary to provide any IC with a resistance compensation function, so it is able to improve the universality of a COFIC, ensure a cost advantage of the display substrate, and facilitate the mass production thereof.

In some embodiments of the present disclosure, the first portions 11 of the data lines have a substantially same resistance, and a sum of the resistance of the second portion 12 and the resistance of the third portion 13 of each data line is substantially the same.

Illustratively, the first portions 11 of the data lines have a substantially same shape and a substantially same size.

Illustratively, each data line has a substantially same width in a direction perpendicular to its extension direction.

Through the above arrangement, it is able to minimize or eliminate the resistance difference between the data lines, ensure consistent Tr and Tf on each data line, and prevent the occurrence of the RC delay due to the resistance difference between the data lines, thereby to prevent the occurrence of the block defect due to different charging levels of the pixels.

In some embodiments of the present disclosure, the at least a part of the data lines include a first data line and a second data line, a length of the second portion 12 of the first data line is greater than a length of the second portion 12 of the second data line, and a length of the third portion 13 of the first data line is smaller than a length of the third portion 13 of the second data line.

Illustratively, the first portion 11 of the first data line has a same length as the first portion 11 of the second data line. Illustratively, the first portion 11 of the first data line has a same resistance as the first portion 11 of the second data line.

It should be appreciated that, the length mentioned herein is not a shortest distance from a start point to an end point, but a length of an actual layout track, for example, a length from the start point to the end point after the data line has been straightened.

The length of the second portion 12 of the first data line is greater than the length of the second portion 12 of the second data line, and the length of the third portion 13 of the first data line is less than the length of the third portion 13 of the second data line, so that the sum of the resistance of the second portion 12 and the resistance of the third portion 13 of the first data line is substantially the same as the sum of the resistance of the second portion 12 and the resistance of the third portion 13 of the second data line.

Through the above arrangement, it is able to minimize or eliminate the resistance difference between the data lines, ensure the consistent Tr and Tf on each data line, and prevent the occurrence of an RC delay due to the resistance difference between the data lines, thereby to prevent the occurrence of the block defect due to different charging levels of pixels.

In some embodiments of the present disclosure, the first portion 11 is arranged at a same layer and made of a same material as the third portion 13.

Illustratively, the display substrate includes a first source/drain metal layer. The first portion 11 and the third portion 13 are arranged at a same layer and made of a same material as the first source/drain metal layer.

Illustratively, the first portion 11 and the third portion 13 belonging to a same data line are formed as an integral structure.

The first portion 11 and the third portion 13 are arranged at the same layer and made of the same material, so that they are formed at the same time through a same patterning process. In this way, it is able to simplify a manufacturing process of the display substrate and reduce the manufacture cost thereof.

In some embodiments of the present disclosure, the first portion 11 and the second portion 12 are arranged at different layers.

Illustratively, the display substrate includes a first gate metal layer and a first source/drain metal layer. The first portion 11 and the first source/drain metal layer are arranged at a same layer and made of a same material, and the second portion 12 and the first gate metal layer are arranged at a same layer and made of a same material.

The first portion 11 and the first source/drain metal layer are arranged at the same layer and made of the same material, so that they are formed at the same time through a same patterning process. In this way, it is able to simplify the manufacturing process of the display substrate and reduce the manufacture cost thereof.

The second portion 12 and the first gate metal layer are arranged at the same layer and made of the same material, so that they are formed at the same time through a same patterning process. In this way, it is able to simplify the manufacturing process of the display substrate and reduce the manufacturing cost thereof.

In some embodiments of the present disclosure, the data lines are divided into a plurality of data line groups.

The display substrate further includes a plurality of chip-on-films corresponding to the data line groups respectively, and each chip-on-film is coupled to the second portions of the data lines in a corresponding data line group.

Illustratively, the data lines are divided into a plurality of data line groups arranged along the second direction. Each data line belongs to only one data line group. Illustratively, the quantity of data lines in each data line group is the same.

Illustratively, a same compensation mode is adopted for each data line group, that is, a group of resistance compensation data is shared, and the third portions 13 are arranged in a same layout.

Illustratively, each chip-on-film (COF) is coupled to the second portions of the data lines in a corresponding data line group, so as to provide a corresponding data signal for each data line in the corresponding data line group.

In some embodiments of the present disclosure, layouts of the first portions of the data lines in each data line group are the same, layouts of the second portions of the data lines in each data line group are the same, and layouts of the third portions of the data lines in each data line group are the same.

Illustratively, the first portions 11 of the data lines have a substantially same shape and a substantially same size, and the layouts of the first portions 11 of the data lines in each data line group are substantially the same.

Illustratively, the second portion 12 of each data line in the data line group is of a fan-like shape, and outer contours of the second portions 12 of the data lines are substantially the same.

Illustratively, outer contours of the third portions of the data lines are substantially the same.

Through the above arrangement, it is able to ensure the symmetry of each data line group, thereby to reduce the compensation complexity and improve the performance of the display substrate.

In some embodiments of the present disclosure, each data line group includes a first group of data lines and a second group of data lines. The second portions 12 of the first group of data lines and the second portions 12 of the second group of data lines are arranged symmetrically. The third portions 13 of the first group of data lines and the third portions 13 of the second group of data lines are arranged symmetrically.

Illustratively, each data line group corresponds to a central axis extending in a same direction as the first portion 11. The first group of data lines are arranged at a first side of the central axis, the second group of data lines are arranged at a second side of the central axis, and the first side is opposite to the second side. Illustratively, the second portions 12 of the first group of data lines and the second portions 12 of the second group of data lines are arranged symmetrically about the corresponding central axis, and the third portions 13 of the first group of data lines and the third portions 13 of the second group of data lines are arranged symmetrically about the corresponding central axis.

Illustratively, the quantity of data lines in each data line group is odd, and an orthogonal projection of the central axis onto a base substrate of the display substrate at least partially overlaps an orthogonal projection of a data line in the middle of the data lines onto the base substrate.

Through the above arrangement, it is able to ensure the symmetry of each data line group, thereby to reduce the compensation complexity and improve the performance of the display substrate.

In some embodiments of the present disclosure, the first portion 11 and/or the third portion 13 includes a bow-shaped bending structure.

Illustratively, the first portion 11 and/or the third portion 13 include a bow-shaped bending structure 30, and the bending structure 30 includes a plurality of bending portions.

Through the above arrangement, it is able to make use of a layout space of the display substrate in a better manner, and improve signal transmission stability of the data line.

In some embodiments of the present disclosure, the display substrate further includes: a plurality of first electro-static discharge circuitries electrically coupled to first ends of the first portions of the data lines respectively, and each configured to discharge static electricity on the corresponding data line; and a plurality of second electro-static discharge circuitries electrically coupled to second ends of the first portions of the data lines respectively, and each configured to discharge static electricity on the corresponding data line.

Illustratively, the first electro-static discharge circuit and the second electro-static discharge circuit each include an Electro-Static Discharge (ESD) unit with a conventional structure.

Illustratively, both the first electro-static discharge circuit and the second electro-static discharge circuit are electrically coupled to a shorting ring 20, so as to discharge static electricity generated on the data line to the shorting ring 20. The shorting ring is electrically coupled to a common electrode 40 through the first electro-static discharge circuit and the second electro-static discharge circuit, so that the static electricity on the shorting ring is discharged by the first electro-static discharge circuit and the second electro-static discharge circuit to the common electrode 40. A signal Vcom is applied to the common electrode 40.

Through the plurality of first electro-static discharge circuit and the plurality of second electro-static discharge circuit, it is able to discharge the static electricity generated on the data line, thereby to improve the operation stability of the display substrate.

The present disclosure further provides in some embodiments a display device including the above-mentioned display substrate.

In the display substrate according to the embodiments of the present disclosure, the non-display area includes the first fan-out area Fan-out1 and the second fan-out area Fan-out2, and the first fan-out area and the second fan-out area are arranged at opposite sides of the display area along the first direction respectively. Each of at least a part of the data lines includes the first portion 11, the second portion 12, and the third portion 13. At least a part of the first portion 11 is arranged in the display area, the second portion 12 is arranged in the first fan-out area Fan-out1, and the third portion 13 is arranged in the second fan-out area Fan-out 2. Through adjusting the resistance of the third portion 13, it is able to adjust the resistance of each data line, thereby to provide the plurality of data lines with a substantially same resistance.

Hence, through adding the third portion 13 in the second fan-out area Fan-out2, it is able to compensate for the resistance of each data line, and minimize or eliminate the resistance difference between the data lines. As a result, it is able to ensure consistent Tr and Tf on each data line, and prevent the occurrence of an RC delay due to the resistance difference between the data lines, thereby to prevent the occurrence of the block defect due to different charging levels of pixels.

In addition, in the display substrate according to the embodiments of the present disclosure, it is unnecessary to provide any IC with a resistance compensation function, so it is able to improve the universality of a COF IC, ensure a cost advantage of the display substrate, and facilitate the mass production thereof.

Hence, when the display device includes the-mentioned above display substrate, it is able to achieve a same beneficial effect, which will not be particularly defined herein.

It should be appreciated that, the display device may be any product or member having a display function, such as a television, a display, a digital photo frame, a mobile phone or a tablet computer. Illustratively, the display device includes a liquid crystal display device.

The present disclosure further provides in some embodiments a method for compensating the above-mentioned display substrate, which includes: determining a length of the third portion 13 of each data line in accordance with a resistance of the second portion 12 of each data line of the display substrate; and determining a layout of the third portion 13 of each data line in accordance with the length of the third portion 13 of each data line.

Illustratively, the display substrate includes a display area and a non-display area surrounding the display area. The non-display area includes a first fan-out area Fan-out1 and a second fan-out area Fan-out2 arranged at opposite sides of the display area along the first direction respectively. Each of at least a part of the data lines includes a first portion 11, a second portion 12 and a third portion 13. At least a part of the first portion 11 is arranged in the display area, the second portion 12 is arranged in the first fan-out area Fan-out1, and the third portion 13 is arranged in the second fan-out area Fan-out 2.

Illustratively, the length of the third portion 13 of each data line is determined in accordance with the resistance of the second portion 12 of the data line, and then the layout of the third portion 13 of each data line is determined in accordance with the length of the third portion 13 of the data line, so as to provide the data lines with a substantially same resistance. Illustratively, the resistance of each of the at least a part of data lines is a sum of the resistance of the first portion 11, the resistance of the second portion 12 and the resistance of the third portion 13.

Illustratively, the resistance of the third portion 13 of each data line depends on the resistance of the second portion 12, so as to minimize the resistance difference between the data lines.

According to the method in the embodiments of the present disclosure, the length of the third portion 13 of each data line is determined in accordance with the resistance of the second portion 12 of the data line of the display substrate, and then the layout of the third portion 13 of the data line in a second fan-out area is determined according to the length of the third portion 13 of the data line. Through adjusting the resistance of the third portion 13, it is able to adjust the resistance of each data line, thereby to provide the plurality of data lines with a substantially same resistance.

Hence, according to the method in the embodiments of the present disclosure, through adding the third portion 13 in the second fan-out area Fan-out2, it is able to compensate for the resistance of each data line, and minimize or eliminate the resistance difference between the data lines. As a result, it is able to ensure consistent Tr and Tf on each data line, and prevent the occurrence of an RC delay due to the resistance difference between the data lines, thereby to prevent the occurrence of the block defect due to different charging levels of pixels.

In addition, in the method according to the embodiments of the present disclosure, it is unnecessary to provide any IC with a resistance compensation function, so it is able to improve the universality of a COF IC, ensure a cost advantage of the display substrate, and facilitate the mass production thereof.

It should be appreciated that, the above embodiments have been described in a progressive manner, and the same or similar contents in the embodiments have not been repeated, i.e., each embodiment has merely focused on the difference from the others. Especially, the method embodiments are substantially similar to the product embodiments, and thus have been described in a simple manner.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "include" or "including" intends to indicate that an element or object before the word contains an element or object or equivalents thereof listed after the word, without excluding any other element or object. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

It should be appreciated that, in the case that such an element as layer, film, region or substrate is arranged "on" or "under" another element, it may be directly arranged "on" or "under" the other element, or an intermediate element may be arranged therebetween.

In the above description, the features, structures, materials or characteristics may be combined in any embodiment or embodiments in an appropriate manner.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A display substrate, comprising a display area and a non-display area surrounding the display area, wherein the non-display area comprises a first fan-out area and a second fan-out area arranged at two opposite sides of the display area along a first direction respectively; and the display substrate further comprises a plurality of data lines extending along the first direction, each data line comprises a first portion, a second portion and a third portion, at least part of the first portion is arranged in the display area, the second portion is arranged in the first fan-out area, the third portion is arranged in the second fan-out area, and the data lines have a substantially same resistance;

wherein the plurality of data lines comprises a first data line and a second data line, the first portion of the first data line has a same length as the first portion of the second data line, a length of a second portion of the first data line is greater than a length of a second portion of the second data line, and a length of a third portion of the first data line is smaller than a length of a third portion of the second data line, and a sum of a resistance of the second portion and a resistance of the third portion of the first data line is substantially the same as a sum of a resistance of the second portion and a resistance of the third portion of the second data line.

2. The display substrate according to claim 1, wherein the first portion is arranged at a same layer and made of a same material as the third portion.

3. The display substrate according to claim 1, wherein the first portion and the second portion are arranged at different layers.

4. The display substrate according to claim 1, wherein the plurality of data lines is divided into a plurality of data line groups, the display substrate further comprises a plurality of chip-on-films corresponding to the data line groups respectively, and each chip-on-film is coupled to the second portions of the data lines in a corresponding data line group.

5. The display substrate according to claim 4, wherein layouts of the first portions of each data line group are substantially the same, layouts of the second portions of each data line group are substantially the same, and layouts of the third portions of each data line group are substantially the same.

6. The display substrate according to claim 4, wherein each data line group comprises a first group of data lines and a second group of data lines, the second portions of the first group of data lines and the second portions of the second group of data lines are arranged symmetrically, and the third portions of the first group of data lines and the third portions of the second group of data lines are arranged symmetrically.

7. The display substrate according to claim 1, wherein the first portion and/or the third portion comprise a bow-shaped bending structure.

8. The display panel according to claim 1, further comprising:

a plurality of first electro-static discharge circuitries electrically coupled to first ends of the first portions respectively, and each configured to discharge static electricity on the corresponding data line; and a plurality of second electro-static discharge circuitries electrically coupled to second ends of the first portions respectively, and each configured to discharge static electricity on the corresponding data line.

9. A display device, comprising the display substrate according to claim 1.

10. A method for compensating the display substrate according to claim 1, comprising:

determining a length of a third portion of each data line in accordance with a resistance of a second portion of each data line of the display substrate; and determining a layout of the third portion of each data line in accordance with the length of the third portion of each data line.

* * * * *